Figure 1:
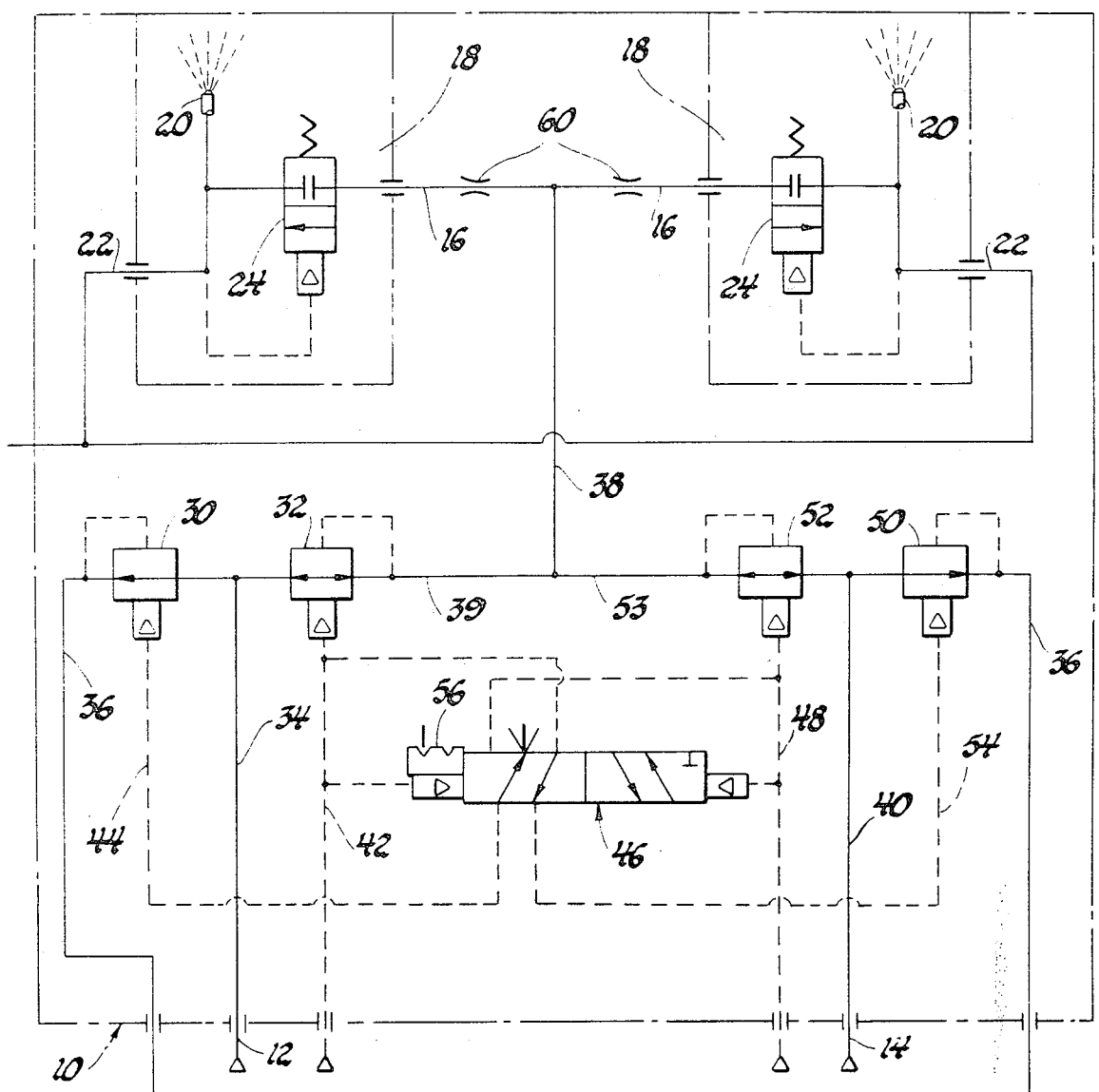

United States Patent [19]

Malarz et al.

[11] Patent Number: 4,489,758

[45] Date of Patent: Dec. 25, 1984

[54] MULTIPLE FUNCTION VALVE ASSEMBLY

[75] Inventors: Antoni J. Malarz, Warren; Dolph D. Wright, Union Lake, both of Mich.

[73] Assignee: General Motors Corporation, Detroit, Mich.

[21] Appl. No.: 446,983

[22] Filed: Dec. 6, 1982

[51] Int. Cl.³ ............................................. F16K 17/04
[52] U.S. Cl. ................................... 137/881; 137/883; 137/885
[58] Field of Search ............... 137/811, 885, 869, 597, 137/883; 239/124, 127; 251/25, 28, 32

[56] References Cited

U.S. PATENT DOCUMENTS

| | | | |
|---|---|---|---|
| 3,009,479 | 11/1961 | Flanders et al. | 137/881 |
| 3,348,774 | 10/1967 | Wiggins | 239/124 |
| 3,450,092 | 6/1969 | Kock | 118/703 |
| 3,870,233 | 3/1975 | Wichelm et al. | 239/692 |

FOREIGN PATENT DOCUMENTS 2240577 2/1974 Fed. Rep. of Germany ...... 239/124

Primary Examiner—Martin P. Schwadron
Assistant Examiner—James R. Shay
Attorney, Agent, or Firm—Warren D. Hill

[57] ABSTRACT

A valve assembly is provided for a paint color change system for directing paint to spray guns from either of two supply lines selectively while connecting the other line to exhaust, and simultaneously controlling the paint pressure as a function of pilot air pressure. A valve block contains two pairs of poppet valves, each pair having a common inlet chamber connected to one of the paint supply lines and containing a pair of poppets each biased toward a seat for controlling flow to an outlet chamber, and a pilot air operated diaphragm in each outlet chamber coupled with a poppet for regulating the position of the poppet in accordance with the paint pressure in the outlet chamber and pilot air pressure. The outlet chambers are connected to an exhaust line and the paint spray guns respectively so that the two pairs of poppet valves acting in concert under control of two pilot air signals can control which paint line is connected to the spray gun or to the exhaust as well as regulate the pressure or volume of paint flowing to the spray guns.

5 Claims, 4 Drawing Figures

MULTIPLE FUNCTION VALVE ASSEMBLY

This invention relates to a multiple function valve assembly and especially to such an assembly responsive to pilot pressure for controlling the direction of flow of fluid applied to each of two inlets and to regulate the fluid pressure.

In automatic paint application equipment, such as that used for spray painting automotive vehicles, it is desirable to quickly change the color of paint being applied so that a series of vehicles or other workpieces can be painted sequentially, each in a different color. It has been proposed to accomplish the color change by a pair of paint supply lines from remote paint supply apparatus to a spray head including valves at the spray head for selectively connecting one of the supply lines to a paint spray gun while connecting the other supply line to an exhaust line. Varying pressure drops in the supply lines result from varying paint viscosity which is a function of the particular paint being used as well as the paint temperature. Pressure variations at the spray gun vary the paint application rate thereby decreasing the efficiency of the paint application systems. It is desirable then to have color selection valving at the spray gun and also to provide a way of maintaining the desired paint pressure or paint flow rate at the gun. While it is known to install a pressure regulating valve in a paint supply line near a spray gun to improve the paint flow it has been found that even a foot or so of paint line between the regulator and the spray gun can result in very significant pressure changes and thus the pressure regulator must be as near as possible to the spray gun. Prior to the present invention the accumulation of the desired directional flow control valves as well as pressure regulators for each supply line at the spray gun resulted in a heavy and bulky array of valves at the spray gun which would limit the usefulness of the gun and even preclude its usage in some applications.

It is therefore an object of this invention to provide a valve assembly for selectively directing flow between inlets and outlets and to simultaneously afford fluid regulation without using separate regulators to achieve the regulation. It is a further object of the invention to provide such a valve arrangement which is compact and lightweight to facilitate its use with automatic paint apparatus.

The invention is carried out by a pair of poppet valves in a single inlet chamber controlling flow through ports in the chamber to outlet chambers and having diaphragms coupled to the poppets and controlled by the outlet chamber pressure and pilot air pressure in opposition so that the valves can be selectively controlled to on or off position by corresponding control of air pressure signals and at least one of the valves can be operated as a pressure regulator in response to the value of pilot air pressure acting on that valve whereupon fluid flow directions as well as pressure regulation is accomplished in the same valve mechanism.

The invention is also carried out by providing in a valve block two pairs or poppet valves, each pair associated with an inlet port and two outlet ports and having a single inlet chamber containing two poppets, each poppet being controlled by a pilot operated diaphragm, at least one of the poppet valves of each pair being arranged to serve as a pressure regulator in accordance with the value of pilot pressure, and both valves having on-off functions to control the direction of flow from the inlet to the outlet.

Figure 2:
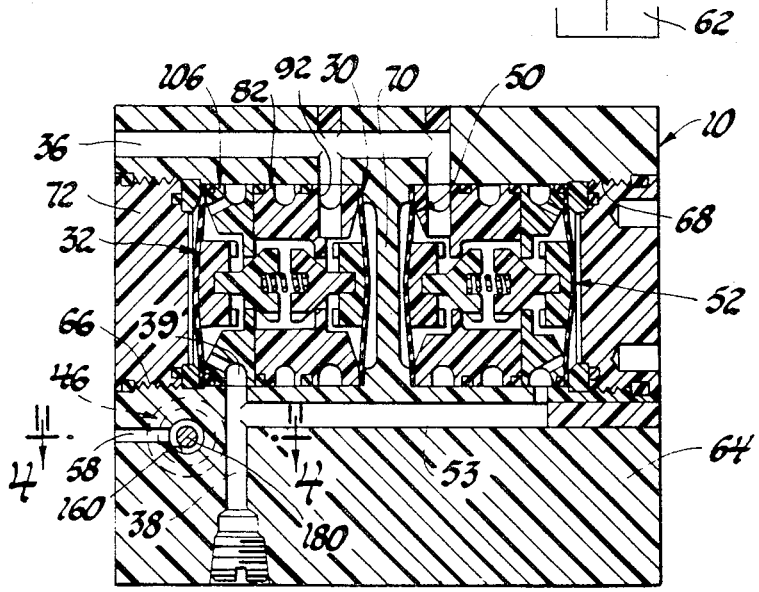
Figure 3:
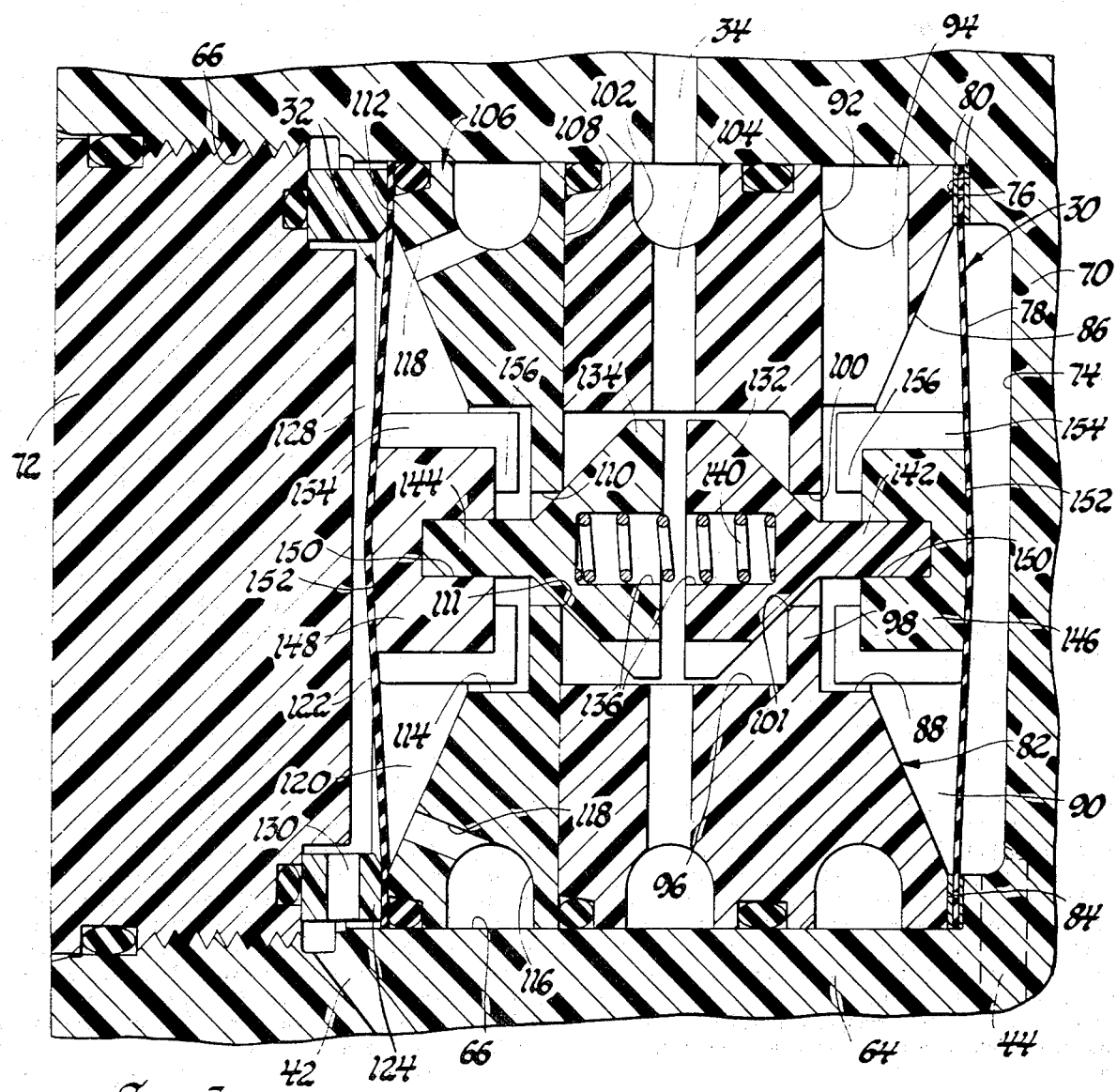
Figure 4:
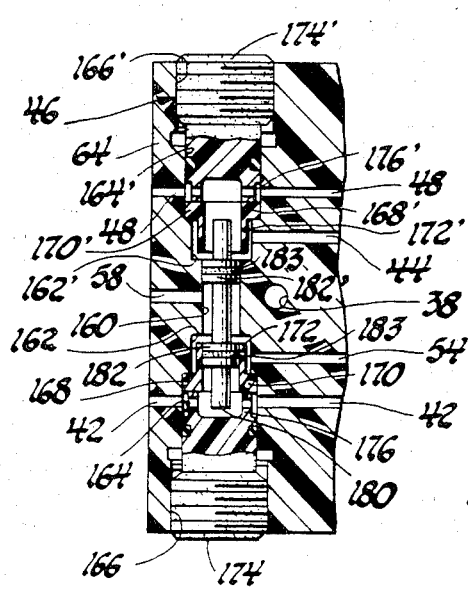

The above and other advantages will be made more apparent from the following description taken in conjunction with the accompanying drawings wherein like reference numerals refer to like parts and wherein:

FIG. 1 is a schematic diagram of a paint spray head illustrating valve functions afforded by the invention, FIG. 2 is a cross-sectional view of the valve assembly according to the invention, FIG. 3 is an enlarged view of a portion of the valve assembly of FIG. 2, and FIG. 4 is another cross-sectional view of the valve assembly taken along line 4—4 of FIG. 2 and which illustrates a pilot control valve according to the invention.

While the valve assembly 10 is described herein in terms of this application to a paint spray system its usefulness is not limited to that purpose, rather it is generally useful for fluid control purposes where flow direction and pressure regulation or flow rate control is desired. In addition it should be recognized that while the assembly as described comprises two pairs of poppet valves for selectively connecting two inlets to two outlets with pressure regulation the same invention applies in principle using a single pair of poppet valves for selectively connecting one inlet to a pair of outlets along with pressure regulation capability.

The function of the valve assembly according to the invention is illustrated in FIG. 1 wherein the valve assembly 10 has two paint input or supply lines 12 and 14 carrying paints of different colors and an outlet line 16 with two branches carrying paint of a single color connected to paint spray guns 18. The two outlet branches 16 in effect form a single outlet of the valve assembly 10 but the drawing reveals that the outlet can be divided into a plurality of parallel lines to serve a plurality of spray guns 18. Each spray gun comprises an atomizing nozzle 20, atomizing air supply line 22, and a pilot operated two-way valve 24 piloted by the atomizing air on line 22 for connecting the paint outlet line 16 to the nozzle 20. The valve 24 is normally off so that paint cannot flow from the line 16 to the nozzle 20 but when atomizing air is applied on line 22 the valve 24 is shifted to on position so that atomizing air and paint are supplied to the nozzle at the same time.

The valve assembly 10 includes a first pair of valves comprising a dump valve 30 and a pressure regulating valve 32, each being connected to a valve inlet line 34 which is coupled to the paint supply line 12. The valves 30 and 32 have downstream pressure regulation capability and their outlets are connected respectively to an exhaust line 36 and to a pressure regulated outlet line 38 via a passage 39. Each of the valves 30 and 32 are pilot operated responsive to pilot air pressure. The valve 32 is directly connected to a pilot line 42 while the valve 30 is connected to the pilot line 44 and through a pilot control valve 46 to a pilot line 48. The pilot air lines as well as the pressure feedback to the valves are shown in dotted lines and it is the balance or imbalance of the pilot pressure and feedback pressure which determines valve operation. A second pair of valves comprising a dump valve 50 and a pressure regulating valve 52 which are identical with valves 30 and 32 respectively are each connected through a valve inlet line 40 to the paint supply line 14 at their input side and connected at their respective outlets to the exhaust line 36 and the regulated outlet line 38 via passage 53. The valve 52 is connected to the air pilot line 48 and the valve 50 is connected to the air pilot line 42 through the pilot control valve 46 and pilot line 54.

The pilot control valve 46 is a pilot operated two position four-way valve having a detent 56 for holding the valve in either position. The valve is connected to pilot lines 42 and 48 so that when only line 42 is pressurized the valve is shifted to the position shown in the drawings and the pilot line 42 is connected through the valve to the pilot line 54. In that position the pilot line 44 is connected through the pilot valve 46 to a vent 58. Under those conditions the valves 32 and 50 will be piloted to open position while the valves 30 and 52 will be closed. Thus any fluid from inlet line 34 will flow through the valve 32 and line 38 to the outlet 16 while fluid in the inlet line 40 will be fed through the valve 50 to exhaust line 36. If while the pilot pressure remains on line 42 a pulse of pilot pressure is also applied to line 48 the valve 46 will not shift due to the detent action and valve 52 will open allowing reverse flow through the valve 52 from the line 38. This back flushing action is used only momentarily in spray painting applications to remove remnants of a previously used paint from the valve 52 and its outlet passage 53. It is the purpose of the valve 46 to make possible this back flushing action. Since the valve system as described is symmetrical the opposite valve operation would occur if the pilot pressure were fed to the line 48 (but not the pilot line 42) to shift the pilot control valve 46 to the other position against the action of the detent 56 so that regulating valve 52 and dump valve 30 will be open.

The outlets 16 contain sharp edged orifices 60 for metering paint flow to the spray guns. Alternatively the orifices 60 could be placed in the paint passage in the spray guns. Their effect is to establish paint flow rate to the guns as a function of paint pressure in line 38 independently of paint viscosity. As will be seen below the paint pressure in the regulated line 38 is a function of the pilot pressure in line 42 or line 48 so that the paint pressure and consequently the paint flow rate to the spray guns can be controlled remotely according to the applied pilot air pressure. The exhaust line is connected to a sump 62 through nonrestricted passages so that only low fluid pressure occurs at the outlet of the dump valves 30 and 50. This absence of back pressure prevents downstream pressure regulation action by the dump valves 30 and 50 even though they have the same structural capability of pressure regulation as the regulation valves 32 and 52.

Thus to summarize the functional operation of the valve assembly 10, the valves 30, 32, 50 and 52 operate as on-off valve to effectively serve in combination as a two position four-way valve for selectively connecting either of two inlets to either of two outlets and provides, with no further structure other than downstream restrictions, accurate remote controlled pressure regulation of outlet fluid. The addition of the pilot control valve 46 permits back flushing of the pressure regulating valves 32 and 52 while not employed for pressure regulation service.

FIG. 2 is a cross-section of the valve assembly 10 showing a valve body 64 having a bore 66 in one side of the body containing the valves 30 and 32 and in the other side of the body a bore 68 coaxial with the bore 66 and spaced therefrom by a web 70. The bore 68 contains the pair of valves 50 and 52. The valve body 64 contains the exhaust line 36 connected with the valves 30 and 50 and the regulated outlet line 38 connected with the valves 32 and 52 by the passages 39 and 53. The valve body also contains the air pilot lines 42 and 48 as well as inlet lines 34 and 40 which are not shown in the section of FIG. 2. The valve 46 is below and transverse of the cavity 66.

The valve details are better shown in FIG. 3 which is an enlarged view of the left half of the valve body 64 containing the valves 30 and 32. These valves are identical in structure to the valves 50 and 52. The section of FIG. 3 differs from that of FIG. 2 in that it shows the air pilot lines 42 and 44 and the supply line 34 in the valve body 64. The cavity 66 is a smooth wall cylindrical bore except for a threaded portion near the opening for receiving a closure plug 72. The web 70 which defines one end wall of the cavity 66 opposite the plug 72 contains a shallow recess 74 slightly smaller in diameter than the cavity 66 to define an annular shoulder 76 between the recess 74 and the cavity 66. A diaphragm 78 seats at its periphery against the shoulder 76 with an annular gasket 80 on either side of the diaphragm for sealing purposes such that the recess 74 is separated from the cavity 66 and defines a pilot cavity which communicates with the pilot passage 44.

A valve insert 82 fits within the cavity 66 and has an annular rim 84 which bears against a gasket 80 to hold the diaphragm 78 against the shoulder 76. The end surface 86 of the insert 82 within the rim 84 tapers inwardly away from the diaphragm 78 and terminates in a central bore 88 thereby forming a chamber 90 between the insert and the diaphragm serving as an outlet chamber 90 of the valve 30. An annular recess 92 in the outer wall of the insert 82 is connected by a passage 94 to the outlet chamber 90. As shown in FIG. 2 a branch of the exhaust line 36 in the body 64 terminates at the groove 92 thereby completing communication of the outlet chamber 90 with the exhaust line 36. The side of the insert 82 opposite the inclined wall 86 contains a cylindrical chamber 96 coaxial with the cavity 66. The chamber 96 has at one end a wall 98 separating the chamber 96 from the chamber 90. The wall 98 contains a central cylindrical port 100 with its axis normal to the wall so that the port meets the wall surface to form a square edge suitable for a valve seat 101. The chamber 96 forms a common inlet chamber for both valves 30 and 32. An annular groove 102 about the periphery of the insert 82 is connected to the inlet chamber by passage 104. A supply line 34 in the valve body 64 terminates at the groove 102 thereby affording a fluid supply to the inlet chamber 96.

A second valve insert 106 in the cavity 66 has a flat wall 108 abutting directly against a flat wall of the insert 82. The wall forms another end of the inlet chamber 96 and contains a port 110 defining a square edged valve seat 111. The other side of the insert 106 contains a flat rim 112 near its outer perimeter and the face within that rim is inclined inwardly toward the wall 108 and terminates at a central coaxial bore 114. The inclined face of the insert forms one wall of the outlet chamber 120 of the valve 32. A circumferential groove 116 in the insert 106 is connected by a passageway 118 to the chamber 120. A diaphragm 122 extending across the cavity 66 in contact with the rim 112 forms another wall of the cavity 120. A ring 124 in the cavity 66 clamps the periphery of the diaphragm 122 against the rim 112 and the threaded plug 72 bears against the ring 124 to securely load the stack of elements including the ring 124, both diaphragms, both inserts, and the seals 80. Sealing is provided by O-rings appropriately seated in pockets in the inserts. The inner face of the plug 72 is spaced from the diaphragm 122 to form the pilot cavity 128 for the valve 32. Apertures 130 in the ring 124 connect the cavity 128 with the air pilot line 42.

Two poppets 132 and 134 are disposed in the inlet chamber 96. The poppets are frustoconical to provide tapered surfaces to engage the valve seats 101, 111 surrounding the ports 100 and 110. Each poppet has a central bore 136 each receiving one end of a spring 140 which biases both poppets toward their respective seats. Each poppet 132 and 134 has at its small end a stem 142 or 144 extending into an outlet chamber toward the diaphragm 78 or 122 respectively. Each stem 142 and 144 is secured to a pilot operator 146 or 148, respectively, which engages the adjacent diaphragm. Each pilot operator has a bore 150 receiving a poppet stem, a face 152 bearing against the respective diaphragm, a series of spaced lateral projections 154 which serve as guides to allow sliding movement of each operator in the respective bore 88 or 114 and stop members 156 integral with the projections 154 which are normally slightly spaced from the wall 98 or 108 to limit the movement of the pilot operator. The spacings between the projections 154 permits fluid flow through the associated port and outlet chamber.

The bias spring 140 is made of stainless steel while all the other valve components are of insulating material. The diaphragms are preferably a polyimide material while the other major valve components are Delrin, for example, which is a trade name of E. I. DuPont de Nemours for a linear polyether resin. The use of insulating material for valve components allows the valve assembly to be used for applications of electro-static spray painting. An alternative structure not shown in the drawing for use with electro-static applications would comprise a conductive insert in each poppet electrically connecting the inlet chamber with the outlet chamber thereby allowing current flow through the poppet to inhibit current flow through a thin band of paint between the poppet and valve seat when the valve is partially open thereby avoiding a problem of localized heating when conductive paints are used.

In operation fluid is admitted through the line 34 to the inlet chamber 96 and if no pilot air pressure is applied to the pilot cavities, the poppets 132 and 134 are biased to the closed position by the spring 140 as well as by the pressure of the fluid in the inlet chamber. If pilot air pressure is applied through the line 44 to the pilot cavity 74 with sufficient pressure to overcome the valve closing bias forces then the valve will open allowing fluid to flow into the outlet chamber 90 to apply pressure on the diaphragm 78 in opposition to the air pilot pressure in the cavity 74. Thus downstream fluid pressure feedback is established to allow the poppet to be positioned by the diaphragm to regulate the downstream pressure. To balance the poppets, the forces due to the pressure differential on the poppet, the spring force, and the fluid pressure on the diaphragm must balance the force from the pilot air pressure on the diaphragm. The spring bias force is a constant value and in the preferred embodiment it is much larger than the force due to the differential pressure on the valve. Consequently, the outlet chamber pressure will be regulated to a value which is a function of the pilot air pressure minus a substantially constant offset force due to the force of the spring 140 although the inlet chamber pressure also plays a minor part in the offset value. The operation of the other poppet valves is of course the same as that just described provided that the fluid passages downstream of the chamber are sufficiently restricted to build up a back pressure capable of pressure regulation by the poppet. Where the valve is utilized as a dump valve and the exhaust line pressure is very low then the fluid pressure in the outlet chamber will not be sufficient to help balance the pressure in the pilot cavity so that when the pilot air is applied the valve will be moved to its full open position and when the pilot pressure is removed the valve will shift to full closed position. Accordingly the poppet valves serve as simple on-off valves or as combination on-off and pressure regulating valves depending upon the back pressure induced in the downstream system.

Referring to FIG. 4, the pilot control valve 46 includes a stepped bore formed in the valve body 64, the bore having its smallest diameter in a central bore 160, second bore regions 162, 162' of larger diameter immediately adjacent each end of the small diameter bore, third bores 164, 164' of still larger diameter just outboard of the regions 162, 162' and finally the largest bore value 166, 166' at the extreme outer ends of the stepped bore. Each of the third area bores 164, 164' has a bushing 168, 168' seated therein, the bushing having a flange 170, 170' engaging the walls of the third bore and a sleeve 172, 172' projecting into the second bore. The bushings have an inner diameter equal to that of the bore 160 and aligned with the bore 160. The sleeves 172, 172' have an outer diameter smaller than the bore 162, 162' in which they are received so that there is an annular space between each sleeve 172, 172' and the bore. The sleeve 172, 172' each terminates at a point short of the bore 160 so that there is a passageway extending through the center of the bushing around its inner end to the annular space outside the sleeve. A plug 174, 174' is threaded into each of the large bores 166 and has a portion extending into the adjacent third bore 164 abutting the flange 170, 170'. Each plug 174, 174' terminates in a radially perforated rim 176, 176' which is spaced inwardly of the sides of the bores 164, 164' to provide annular passageways therearound. Each plug contains a central cavity connected by the perforated rim 176, 176' to the annular passageway, the central cavity also being aligned with the open center of the bushing 168. A spool 180 having a pair of lands 182, 182' is slidably located within the small bore 160 and the bushings 168, 168', the lands being so spaced that when the spool is in either extreme position, one land will be located within one of the bushings 168, 168' to prevent airflow therethrough while the other land is located in the bore 160 to block air flow there but allowing air flow through the other bushing. Each land 182 carries a peripheral O-ring seal 183 frictionally engaging the bore and bushings to provide a detent action by resisting a reversal of direction of spool movement but allowing smooth shifting once movement has begun. The air pilot passage 42 enters the valve body at one face and intersects with the annular passage around the rim 176 of the plug 174 and continues through the valve body to the pilot air cavity 128 as shown in FIG. 3. In like manner the air pilot passage 48 extends from a face of the valve body and intersects an annular air passage around the rim of the other plug 174'. The air pilot passages 44 and 54 extend from the second bores 162 through the valve body to their respective pilot air cavities and thus are in communication with the annular spaces outside of the sleeves 172. A vent passage 58 intersects the inner bore 160.

In operation, if air pressure is applied to the line 48, the pressure will be directly admitted to the associated valve cavity and also will be admitted through the perforations in the rim of the plug 174' to push the spool land 182' out of the sleeve 172' and into the bore 160 and push the land 182 into the sleeve 172 to the position shown in the drawing thereby allowing air passage through the sleeve 172' and into the passage 44 which is connected to the pilot cavity 74. The passage 54 will be vented through the bore 160' and the vent passage 58. The sleeve 172 will be blocked by the land 182 of the spool to prevent air flow therethrough. If a pulse of air pressure were then applied through line 42 to effect back flushing of the valves 32 the pressure would be applied directly to that valve but would not flow through the sleeve 172. If air pressure were applied only to the passage 42 then the spool would be shifted to the other direction so that then air pressure would be applied not only to the passage 42 but the passage 54 as well, while the passage 44 would be vented through the passage 58.

It will thus be seen that the valve assembly provides a compact unit offering multiple functions for controlling the flow direction of fluid admitted to the assembly and, for flow in at least one direction, provides a pressure regulating action as a function of pilot pressure without additional control elements beyond that required for the flow direction control.

The embodiments of the invention in which an exclusive property or privilege is claimed are defined as follows:

1. A valve assembly for selectively delivering a fluid from an input through first and second outlets and having the capability of selectively regulating outlet pressure at one outlet at a pressure determined by a pilot pressure and discharging fluid at the other outlet at a low pressure, comprising in a valve body
    first and second flow control valves having
    (a) a common inlet chamber connected to the input, the chamber including two opposed ports defining valve seats,
    (b) two poppets in the inlet chamber biased toward seating engagement with the valve seats,
    (c) a diaphragm spaced from each port outboard of the inlet chamber to define an outlet chamber outboard of each port, the outlet chambers connected to the said first and second outlets respectively,
    (d) a pilot cavity on one side of each diaphragm opposite the respective outlet chamber and means for admitting pilot pressure to each pilot cavity so that diaphragm deflection is a function of pilot pressure and fluid pressure in the opposing outlet chamber, and
    (e) means coupling each diaphragm to a corresponding one of the poppets for movement of a poppet from its seat when the respective diaphragm deflects toward the inlet chamber to allow fluid flow from the inlet chamber to an outlet chamber,
    a restriction downstream of the first valve for maintaining a fluid pressure in the corresponding outlet chamber as a function of the pilot pressure for that valve to cause a pressure regulating action on the first valve, and
    an exhaust line coupled to the second valve outlet to maintain a corresponding outlet chamber pressure lower than the pilot pressure applied to the second valve so that the second valve serves as an on-off valve in response to pilot pressure.

2. A valve assembly for selectively delivering a fluid from an input through first and second outlets and having the capability of selectively regulating outlet pressure at one outlet at a pressure determined by a pilot pressure and discharging fluid at the other outlet at a low pressure, comprising in a valve body
    first and second flow control valves having
    (a) a common inlet chamber connected to the input, the chamber including two opposed ports defining valve seats,
    (b) two poppets in the inlet chamber biased toward seating engagement with the valve seats,
    (c) a diaphragm spaced from each port outboard of the inlet chamber to define an outlet chamber outboard of each port, the outlet chambers connected to the said first and second outlets respectively,
    (d) a pilot cavity on one side of each diaphragm opposite the respective outlet chamber and means for admitting pilot pressure to each pilot cavity so that diaphragm deflection is a function of pilot pressure and fluid pressure in the opposing outlet chamber, and
    (e) means coupling each diaphragm to a corresponding one of the poppets for movement of a poppet from its seat when the respective diaphragm deflects toward the inlet chamber to allow fluid flow from the inlet chamber to an outlet chamber,
    a restriction downstream of the first valve for maintaining a fluid pressure in the corresponding outlet chamber as a function of the pilot pressure for that valve to cause a pressure regulating action on the first valve,
    an exhaust line coupled to the second valve outlet to maintain a corresponding outlet chamber pressure lower than the pilot pressure applied to the second valve so that the second valve serves as an on-off valve in response to pilot pressure, and
    the means for admitting pilot pressure to each pilot cavity including pilot valve means for alternatively admitting the pilot pressure to one or the other of the pilot cavities to effect delivery of fluid selectively through the first and second outlets.

3. A valve assembly for delivery first outlet a fluid selected from either one of two inputs at a pressure determined by a pilot pressure and delivering from a second outlet fluid from the other of the inputs comprising in a valve body
    two pairs of flow control valves, each pair of valves having
    (a) a common inlet chamber connected to one of the inputs, the chamber including two opposed ports defining valve seats,
    (b) two poppets in the inlet chamber biased toward seating engagement with the valve seats,
    (c) a diaphragm spaced from each port outboard of the inlet chamber to define an outlet chamber outboard of each port, the outlet chambers connected to the said first and second outlets respectively,
    (d) a pilot cavity on one side of each diaphragm opposite the respective outlet chamber and means for admitting pilot pressure to each pilot cavity so that diaphragm deflection is a function of pilot pressure and fluid pressure in the opposing outlet chamber, and (e) means coupling each diaphragm to a corresponding one of the poppets for movement of a poppet from its seat when the respective diaphragm deflects toward the inlet chamber, so that when the pressure fluid in an outlet chamber acts on the diaphragm with sufficient force to balance the pilot pressure a pressure regulating action on the valve occurs whereby the fluid pressure in the outlet chamber is a function of the pilot pressure, and the means for admitting pilot pressure to each pilot cavity including (a) two pilot pressure inlet passages connected to one pilot cavity of each of the two pairs of valves respectively, and (b) pilot operated valve means connected to the pilot pressure inlet passage for selectively connecting the inlet passages to the other pilot cavity of the two pairs of valves, whereby when one input is coupled to the first outlet for fluid flow therethrough the other input is coupled to the second outlet.

4. A valve assembly for delivery from a first outlet a fluid selected from either of two inputs at a pressure determined by a pilot pressure and delivering from a second outlet fluid from the other of the inputs comprising in a valve body first and second pairs of flow control valves, each pair of valves having (a) a common inlet chamber connected to one of the inputs, the chamber including two opposed ports defining valve seats, (b) two poppets in the inlet chamber biased by a bias force toward seating engagement with the valve seats, (c) a diaphragm spaced from each port outboard of the inlet chamber to define first and second outlet chambers outboard of the ports, the first and second outlet chambers connected to the said first and second outlets respectively, (d) first and second pilot cavities on the side of the diaphragms opposite the respective first and second outlet chamber for receiving pilot pressure so that diaphragm deflection is a function of pilot pressure and fluid pressure in the opposing outlet chamber, and (e) means coupling each diaphragm to a corresponding one of the poppets for movement of a poppet from its seat when the respective diaphragm deflects toward the inlet chamber, so that when the pressure of fluid in an outlet chamber and the bias force act on the diaphragm with sufficient force to balance the pilot pressure a pressure regulating action on the valve occurs whereby the fluid pressure in the outlet chamber is a function of the pilot pressure, first and second pilot pressure inlet passages connected to the first pilot cavity of the first and second pairs of valves respectively, a pilot operated four-way valve connected to the pilot pressure inlet passages for control thereby for coupling the first pilot pressure inlet passage to the second pilot cavity of the second pair of valves when the first pilot pressure inlet passage carries operating pressure and for coupling the second pilot pressure inlet passage to the second pilot cavity of the first pair of valves when the second pilot pressure inlet passage carries operating pressure so that fluid flow occurs simultaneously in the first outlet chamber of one of the said pairs of valves and in the second outlet chamber of the other of the said pairs of valves.

5. A valve assembly for delivery from a first outlet a fluid selected from either of two inputs at a pressure determined by a pilot pressure and delivering from a second outlet liquid from the other of the inputs comprising a valve body, two coaxial cylindrical cavities in the valve body separated by a web integral with the valve body, each cavity containing a pair of flow control valves including (a) a first diaphragm across an inner end of the cavity and spaced from the web to form a first pilot cavity, (b) a first insert in the cavity adjacent the first diaphragm, (c) a recess in the first insert adjacent the first diaphragm to define a first outlet chamber between the first insert and the first diaphragm, (d) a second insert in the cavity abutting the first insert, (e) a second diaphragm in the cavity adjacent the second insert, (f) a recess in the second insert adjacent the second diaphragm to define a second outlet chamber between the second insert and the second diaphragm, (g) a plug secured in the cavity outboard of the second diaphragm and having a wall spaced therefrom to form a second pilot cavity, the plug including means for securing the said inserts and diaphragms in the cavity, (h) the inserts together defining an inlet chamber coaxial with the cavity, each insert having a wall defining the ends of the inlet chamber, (i) a port in each wall defining a valve seat coaxial with the cavity, (j) a pair of poppets in the inlet chamber, each poppet being biased toward seat engagement with a corresponding valve seat, and (k) each poppet having stem means extending through its respective port into operative engagement with a corresponding diaphragm so that diaphragm deflection toward a port effects movement of a poppet from its seat, first passage means in the valve body coupled to an inlet chamber of each cavity to form the two inputs, second passage means coupled to one of the outlet chambers of each cavity to form the first outlet, and third passage means coupled to the other of the outlet chambers of each cavity to form the second outlet, and means for selectively coupling pilot pressure to each pilot cavity whereby pilot pressure on one side of each diaphragm seeks to balance outlet chamber pressure and poppet bias on the other side of each diaphragm to determine flow control and pressure regulation.

* * * * *